United States Patent [19]

Kasowski et al.

[11] Patent Number: 5,382,650
[45] Date of Patent: Jan. 17, 1995

[54] CATALYSTS FOR POLYESTER PRODUCTION

[75] Inventors: Robert V. Kasowski, West Chester; Robert R. Burch, Jr., Exton, both of Pa.

[73] Assignee: E. I. du Pont de Nemours and Company, Wilmington, Del.

[21] Appl. No.: 170,477

[22] Filed: Dec. 20, 1993

[51] Int. Cl.⁶ ............................................. C08G 63/82
[52] U.S. Cl. .................................. 528/277; 528/272; 528/275; 528/308; 528/308.6
[58] Field of Search ............. 528/272, 275, 308, 308.6

[56] References Cited

U.S. PATENT DOCUMENTS 5,041,525  8/1991  Jackson ................................ 528/272
5,096,773  3/1992  Sakamoto ............................. 428/323
5,279,881  1/1994  Kotani .................................. 428/323

OTHER PUBLICATIONS

Mark, H. (Ed.), et al., *Encyclopedia of Polymer Science & Engineering*, John Wiley & Sons, NY, 12, 1–75, 1988.
Joensen, P. et al, *Mat. Res. Bull.*, 21, 457–461, 1986.
Dines, M. B., *Mat. Res. Bull.*, 10, 287–292, 1975.

*Primary Examiner*—Samuel A. Acquah

[57] ABSTRACT

Novel catalysts for polyester production by esterification and/or transesterification are $MoS_2$ or $WS_2$ which have been intercalated by alkali metals cations, especially lithium cations, and then contacted with an alcohol or a polyol, a preferred polyol being a glycol which is one of the monomeric units in the polyester produced.

24 Claims, No Drawings

CATALYSTS FOR POLYESTER PRODUCTION

FIELD OF THE INVENTION

This invention concerns an improved catalyst for the production of polyesters by esterification or transesterification which comprises $MoS_2$ or $WS_2$ which is intercalated with an alkali metal cation and then contacted with an alcohol or polyol.

TECHNICAL BACKGROUND

Polyesters are an important class of polymers, being used commercially for fibers, films, molding resins, and many other uses. Many of these polyesters are produced by the esterification and/or transesterification of the appropriate monomers and/or oligomers, see for instance H. Mark, et al., Ed., Encyclopedia of Polymer Science and Engineering, vol. 12, John Wiley & Sons, New York, 1988, p. 1–75. Such processes are well known in the art, and often employ catalysts to speed up the formation of polymer of an appropriate molecular weight. Many different types of catalysts have been used, among the more commonly used catalysts are antimony compounds such as $Sb_2O_3$, and titanium compounds such as tetraalkoxytitanates.

P. Joensen, et al., Mat. Res. Bull., vol. 21, p. 457–461 (1986) have reported on the formation of exfoliated $MoS_2$ by reaction of $MOS_2$ intercalated with lithium ion with water or an alcohol. There is no mention of the use of this material as a polymerization catalyst or as a polyester additive.

U.S. Pat. No. 5,041,525 discloses that lithium glycolate is a transesterification catalyst. No mention is made of using a catalyst containing intercalated lithium (or other alkali metal ions).

SUMMARY OF THE INVENTION

This invention concerns a process for the production of polyesters by esterification and/or transesterification, wherein the improvement comprises, a catalyst which is $MoS_2$ or $WS_2$ which is intercalated by one or more alkali metal cations and then contacted with an aliphatic alcohol or aliphatic polyol.

This invention also concerns a composition, comprising, $MoS_2$ or $WS_2$ which has been intercalated with an alkali metal cation and then contacted with, an aliphatic glycol, or the bis-monoester of an aliphatic glycol.

DETAILS OF THE INVENTION

This invention concerns the novel use of an intercalated compound as a catalyst for the production of polyesters by esterification and/or transesterification. The catalyst is either $MoS_2$ or $WS_2$ intercalated with an alkali metal cation, preferably lithium cation, which is then contacted with (the alkali metal cation is believed to form the alkali metal alkoxide) an alcohol or aliphatic polyol. Intercalated $MoS_2$ or $WS_2$ can be made by the procedure of M. B. Dines, Mat. Res. Bul., vol. 10, p. 287–292 (1975) which is hereby included by reference. It is preferred if the $MoS_2$ or $WS_2$ is intercalated with the maximum amount of alkali metal cation which the $MoS_2$ or $WS_2$ will "accept" according to the procedure of Dines.

The intercalated $MoS_2$ or $WS_2$ is then contacted with an alcohol or aliphatic polyol to form the catalyst. By an alcohol is meant an aliphatic monol. By an aliphatic polyol is meant a compound containing two or more hydroxyl groups which are directly bound to a saturated carbon atom. In a preferred catalyst the intercalated $MoS_2$ or $WS_2$ is contacted with an aliphatic polyol which is an aliphatic glycol. By an aliphatic glycol is meant an aliphatic polyol which contains two hydroxyl groups per molecule. The reaction with the alcohol or polyol is carried out by contacting the intercalated $MoS_2$ or $WS_2$ with the alcohol or polyol in the liquid or gas state, preferably the liquid state. The temperature of this reaction is not critical, and ambient temperature is a convenient operating temperature. The alcohol or polyol in the liquid state may be neat or mixed with other liquids, such as solvents, or polymerization mixtures containing the alcohol or polyol. It is preferred if at least one equivalent of hydroxyl groups per mole of alkali metal cation in the intercalated $MoS_2$ or $WS_2$ is used, and typically a large excess of hydroxyl groups (at least 2 to 3 times) are added.

Suitable alcohols include methanol, ethanol, benzyl alcohol, and cyclohexanol. Suitable glycols include ethylene glycol, 1,3-propanediol, 1,4-butanediol, 1,4-bis(hydroxymethyl) cyclohexane and 1,3-bis(hydroxymethyl)benzene. Preferred glycols are ethylene glycol and 1,4-butanediol, and ethylene glycol is especially preferred. If the composition is to be used as a polyester polymerization catalyst, a glycol which is one of the monomers for the polymerization is preferred. In another preferred mode, the reaction with a glycol is carried out in a polyester polymerization mixture wherein a glycol is initially present or is formed as the polymerization proceeds. For example, if one is making poly(ethylene terephthalate), ethylene glycol may be initially present in the polymerization mixture or is generated during the polymerization. The glycol may also be the bis-monoester, which is a dihalf ester of a glycol and a dicarboxylic acid, such as bis(2-hydroxyethyl)terephthalate, bis(4-hydroxybutyl)terephthalate, or bis(2-hydroxyethyl)adipate. Useful polyols (excluding glycols) include glycerin, and pentaerythritol. It is believed that the reaction with an alcohol or polyol causes exfoliation or partial exfoliation of the intercalated $MoS_2$ or $WS_2$.

The above described $MoS_2$ and $WS_2$, intercalated with an alkali metal cation, and subsequently contacted with an alcohol or polyol (either before or at the beginning of a polyester polymerization), is a catalyst for the production of polyesters by esterification and/or transesterification. Such processes are well known in the art, see for instance H. Mark, et al., Ed., supra, which is hereby included by reference.

The novel catalysts described herein may be used alone in the production of polyesters, or in combination with other known catalysts for esterification and/or transesterification. In one preferred mode, the novel catalysts herein are used in combination with an antimony or titanium containing catalyst, such as $Sb_2O_3$ or a tetraalkoxytitanium compound, respectively. For catalytic purposes catalyst concentration is not critical, and the instant catalyst can be used at about 0.05% to about 5%, preferably about 0.5% to about 2%, by weight of the final polymer which is produced. It is most convenient to allow the catalyst residues to remain in the final polyester.

The $MoS_2$ and $WS_2$ based catalysts may be used in any of the processes used to make polyesters, such as those in which just essentially the polymerizable materials (and catalyst) are present (a "melt" polymerization), in nonaqueous suspension or in solution.

Polyesters that may be made using the instant catalysts include, but are not limited to, poly(ethylene adipate), poly(ethylene terephthalate), poly(1,4-butylene terephthalate), poly[1,4-bis(oxymethyl)cyclohexylene terephthalate], poly[ethylene/1,4-bis(oxymethyl)cyclohexylene terephthalate], a block copolymer of poly(tetramethylene ether glycol) and poly(butylene terephthalate), and poly(butylene adipate/terephthalate). It is preferred to make poly(ethylene terephthalate), poly(1,4-butylene terephthalate), and a block copolymer of poly(tetramethylene ether glycol) and poly(1,4-butylene terephthalate) using the instant catalysts, and more preferred if poly(ethylene terephthalate) is made.

The polymerizations herein can be carried out on a variety of compounds that act as "monomers" in the preparation of polyesters by esterification and/or transesterification. For instance, in the case of poly(ethylene terephthalate) the starting materials may be: dimethyl terephthalate and ethylene glycol; terephthalic acid and ethylene glycol; or 1,4-bis(2-hydroxyethyl)terephthalate and/or its oligomers. One may also start with poly(ethylene terephthalate) and simply increase its molecular weight. Similar starting materials may be used to make other polyesters.

It has also been found that poly(ethylene terephthalate) (PET) made using the above catalysts, and in which the catalyst residues have not been removed, surprisingly has a higher heat deflection temperature that PET made with other catalysts. In the Examples, the following abbreviations are used:

BHET—bis(2-hydroxyethyl) terephthalate
HDT—Heat Deflection Temperature, measured using ASTM method D648, at 1.82 MPa
Mn—number average molecular weight
Mw—weight average molecular weight
Mz—viscosity average molecular weight

EXAMPLE 1

The $MoS_2$ powder was obtained from Aldrich Chemical Co., Milwaukee, Wis. (Catalog No. 23,484-2). The $MoS_2$ was soaked in a 1.6M solution of n-butyl lithium in hexane for approximately 48 hours, in a nitrogen blanketed dry box. The amount of n-butyl Li was slightly in access of one Li per Mo. Following the intercalation of the $MoS_2$ by lithium, the $MoS_2$ was removed. It was then washed with hexane about three times to remove Li and degradation products of the reaction of n-butyl Li and $MoS_2$. This powder was then put in ethylene glycol. By weight, the amount of $MoS_2$/Li in the glycol varied from 0.1% to approximately 10%. The distance between $MoS_2$ sheets was increased by this process, but there was not substantial exfoliation.

EXAMPLE 2

BHET (40.0 g), 6 μL of $Ti(OC_3H_7)_4$, 20.0 g of $MoS_2$/Li slurry as made in Example 1 in ethylene glycol (0.1% $MoS_2$), and 400 mL of dry de-oxygenated hexadecane were charged into a three neck flask with mechanical stirrer, distillation head, and nitrogen source. The resulting suspension was heated with stirring for two hours during which time ethylene glycol distilled from the slurry as an azeotrope with the hexadecane, leaving a melt of polyethylene terephthalate containing the $MoS_2$/Li exfoliate. The product was allowed to cool and 19.0 g of the polyethylene terephthalate containing the $MoS_2$ was isolated. This material showed in the gel permeation chromatogram (hexafluoroisopropanol solution, polyethylene terephthalate standards): Mw=82100, Mz=174,000, [η]=1.23.

EXAMPLE 3

BHET (40.0 g), 6 μL of $Ti(OC_3H_7)_4$, 0.02 g of $MoS_2$ slurry as prepared in Example 1 in 20 mL ethylene glycol, and 400 mL of dry de-oxygenated hexadecane were charged into a three neck flask with mechanical stirrer, distillation head, and nitrogen source. The resulting suspension was heated with stirring for one hour during which time 200 mL of ethylene glycol/hexadecane azeotrope distilled from the slurry, leaving a melt of polyethylene terephthalate containing the $MoS_2$. The product was allowed to cool and the polyethylene terephthalate containing the $MoS_2$ was isolated. This material showed in the gel permeation chromatogram (hexafluoroisopropanol solution, polyethylene terephthalate standards): Mw=62,300, Mz=111,000, [η]=1.04. The inherent viscosity (hexafluoroisopropanol solution, 0.5%, 30° C.) was 0.89 dL/g.

EXAMPLE 4

BHET (40.0 g) 0.80 g of $MoS_2$ as a slurry as prepared in Example 1 in 20 mL ethylene glycol, and 400 mL of dry de-oxygenated hexadecane were charged into a three neck flask with mechanical stirrer, distillation head, and nitrogen source. The resulting suspension was heated with stirring for one hour during which time 200 mL of ethylene glycol/hexadecane azeotrope distilled from the slurry, leaving a melt of polyethylene terephthalate containing the $MoS_2$. The product was allowed to cool and the polyethylene terephthalate containing the $MoS_2$/Li exfoliate was isolated. This material showed in the gel permeation chromatogram (hexafluoroisopropanol solution, polyethylene terephthalate standards): Mw=53,400, Mz=120,000, [η]=0.91. The inherent viscosity (hexafluoroisopropanol solution, 0.5%, 30° C.) was 0.64 dL/g.

COMPARATIVE EXAMPLE 1

BHET (40.0 G) and 400 mL of dry de-oxygenated hexadecane were charged into a three neck flask with mechanical stirrer, distillation head, and nitrogen source. The resulting suspension was heated with stirring for one hour during which time 200 mL of ethylene glycol/hexadecane azeotrope distilled from the slurry, leaving a melt of polyethylene terephthalate. The product was allowed to cool and the polyethylene terephthalate was isolated. This material showed in the gel permeation chromatogram (hexafluoroisopropanol solution, polyethylene terephthalate standards): Mn=3480, Mw=5590, Mz=8500, showing that this product is low molecular weight oligomeric polyethylene terephthalate.

EXAMPLE 5

A 10 lb. capacity stainless steel autoclave was charged with 6.5 lbs. of polyethylene terephthalate, 4.1 grams of $Sb_2O_3$, and 3.5 lbs. of a 1% slurry of $MoS_2$ in ethylene glycol as made in Example 1. The autoclave was purged with nitrogen, closed, and heated to 240° C. at autogeneous pressure for one hour, while agitating the contents of the autoclave. Under these conditions, the amount of ethylene glycol in the reactor was sufficient to depolymerize the polymer completely to BHET. The pressure in the autoclave was then reduced to approximately 2 torr while the temperature was raised to 275° C. while the agitation was continued.

High molecular weight polymer was isolated from the autoclave after 65 minutes under these conditions. This polymer showed in the gel permeation chromatogram (hexafluoroisopropanol solution, polyethylene terephthalate standards): Mw=54,300, Mz=98,700, $[\eta]$=0.942. The inherent viscosity (hexafluoroisopropanol solution, 0.5%, 30° C.) is 0.85 dL/g.

COMPARATIVE EXAMPLE 2

A 10 lb. capacity stainless steel autoclave was charged with 6.5 lbss of polyethylene terepthalate and 4.1 grams of $Sb_2O_3$, and 3.5 lbs. of ethylene glycol. The autoclave was purged with nitrogen, closed, and heated to 240° C. at autogeneous pressure for one hour, while agitating the contents of the autoclave. Under these conditions, the amount of ethylene glycol in the reactor was sufficient to depolymerize the polymer completely to BHET. The pressure in the autoclave was then reduced to approximately 2 torr while the temperature was raised to 275° C. while the agitation was continued. High molecular weight polymer was isolated from the autoclave after 150 minutes under these conditions. This polymer showed in the gel permeation chromatogram (hexafluoroisopropanol solution, polyethylene terephthalate standards): Mw=48,400, Mz=78,700, $[\eta]$=0.881. The inherent viscosity (hexafluoroisopropanol solution, 0.5%, 30° C.) is 0.81 dL/g.

EXAMPLES 6-9

Polymerizations were run similar to that of Example 4. Particulars are given below:

| Example No. | Catalyst(s) | Time to Finished Polymer | Inherent Polymer Viscosity |
|---|---|---|---|
| 6 | 4.1 g $Sb_2O_3$ 14.5 g $MoS_2$ | 65 min. | 0.85 |
| 7 | 4.1 g $Sb_2O_3$ 2.9 g $MoS_2$ | 90 min. | 0.75 |
| 8 | 4.1 g $Sb_2O_3$ | 150 min. | 0.81 |
| 9 | 14.8 g $MoS_2$ | 85 min. | 0.82 |

EXAMPLE 10

$WS_2$ powder was obtained from Aldrich Chemical Co., Milwaukee, Wis. (Catalog No. 24,363-9). About 30 g of $WS_2$ is mixed into 400 ml of 1.6M solution of n-butyl Li in hexane in a nitrogen dry box. The solution is sonicated for one hour and is then allowed to soak for approximately 48 hours in a nitrogen dry box. The $WS_2$ solution is again sonicated for 1 hour. Following the intercalation of the $WS_2$ by lithium, the $WS_2$ was then washed with hexane about three times to remove Li and degradation products of the reaction of n-butyl Li and $WS_2$. This powder was then put in ethylene glycol and sonicated once again for one hour. By weight, the amount of $WS_2$/Li in the glycol varied from 0.1% to approximately 10%. The distance between $WS_2$ sheets was increased by this process, but there was not substantial exfoliation.

EXAMPLE 11

The PET from Example 5 was fed into an injection molding machine that molds bars 12.7 cm×1.30 cm×0.32 cm, suitable for heat deflection temperature measurements. The barrel temperature was 250° C. and the mold temperature was 80° C. The inject time was 15 seconds and the hold time was 30 seconds. The average HDT was 104.1° C.

COMPARATIVE EXAMPLE 3

The PET from Comparative Example 2 was fed into an injection molding machine that molded bars 12.7 cm×1.3 cm×0.32 cm suitable for heat deflection temperature measurements. The barrel temperature was 250° C. and the mold temperature was 50° C. The inject time was 15 seconds and the hold time was 30 seconds. The average HDT was 99.1° C.

EXAMPLE 12

A 10 lb. stainless steel autoclave was charged with 6.5 lbs. of polyethylene terephthalate, 14.76 g of $WS_2$/Li as a slurry in 3.5 lbs. of ethylene glycol and 4.1 g $Sb_2O_3$. The autoclave was purged with nitrogen, closed, and heated at 240° C. at autogeneous pressure for one hour, while agitating the contents of the autoclave. Under these conditions, the amount of ethylene glycol in the autoclave was sufficient to depolymerize the polymer completely to the monomer bis(2-hydroxyethyl)terephthalate. The pressure in the autoclave was then reduced to approximately 2 torr while the temperature was raised to 275° C. while the agitation was continued. High molecular weight polymer was isolated from the autoclave after 55 minutes under these conditions. This polymer showed in the gel permeation chromatogram (hexafluoroisopropanol solution, polyethylene terephthalate standards): Mw=53,335, Mz=90,741. The inherent viscosity was 0.80 dL/g (hexafluoroisopropanol solution, 0.5%, 30° C.).

EXAMPLE 13

The PET from Example 12 was fed into an injection molding machine that molded bars 12.7 cm×1.3 cm 0.32 cm suitable for heat deflection temperature measurements. The barrel temperature was 250° C. and the mold temperature was 80° C. The inject time was 15 seconds and the hold time was 30 seconds. The average HDT was 108.4° C.

We claim:

1. A process for the production of polyesters by esterification or transesterification or esterification and transesterification, wherein the improvement comprises, a catalyst selected from $MoS_2$ and $WS_2$ which is intercalated by one or more alkali metal cations and then contacted with an aliphatic alcohol or aliphatic polyol.

2. The process as recited in claim 1 wherein the alkali metal cation is lithium cation.

3. The process as recited in claim 2 wherein the aliphatic polyol is selected from the group consisting of ethylene glycol, 1,3-propanediol, 1,4-butanediol, 1,4-bis(hydroxymethyl) cyclohexane and 1,3-bis(hydroxymethyl)benzene.

4. The process as recited in claim 3 wherein the polyol is selected from the group consisting of ethylene glycol and 1,4-butanediol.

5. The process as recited in claim 4 wherein the polyol is ethylene glycol.

6. The process as recited in claim 2 wherein the polyol is a glycol which is one of the monomers of the polymerization.

7. The process as recited in claim 2 wherein the polyol is a glycol and said contacting is carried out in a polyester polymerization mixture wherein the glycol is initially present or is formed as the polymerization proceeds.

8. The process as recited in claim 2 wherein the polyol is a glycol which is a bis-monoester selected from the group consisting of bis(2-hydroxyethyl)terephthalate and bis(4-hydroxybutyl)terephthalate.

9. The process according to claim 2 wherein the aliphatic alcohol or aliphatic polyol is in the liquid state.

10. The process as recited in claim 2 wherein at least one equivalent of hydroxyl groups per mole of alkali metal cation in the intercalated $MoS_2$ or $WS_2$ is used.

11. The process as recited in claim 2 wherein the catalyst is about 0.05% to about 5%, by weight of the final polymer produced.

12. The process as recited in claim 2 wherein the catalyst is about 0.5% to about 2% by weight of the final polymer which is produced.

13. The process as recited in claim 2 wherein the polyester produced is poly(ethylene terephthalate) or poly(1,4-butylene terephthalate).

14. The process as recited in claim 2 wherein the polyester produced is poly(ethylene terephthalate).

15. The process as recited in claim 5 wherein the polyester produced is poly(ethylene terephthalate).

16. The product of the process of claim 1.

17. The product of the process of claim 2.

18. The product of the process of claim 13.

19. The product of the process of claim 15.

20. A composition, comprising, $MoS_2$ or $WS_2$ which has been intercalated with an alkali metal cation and then contacted with an aliphatic glycol or the bis-monoester of an aliphatic glycol.

21. The composition according to claim 20 wherein the alkali metal cation is lithium cation.

22. The composition according to claim 21 wherein the aliphatic polyol is a glycol which is selected from the group consisting of ethylene glycol, 1,3-propanediol, 1,4-butanediol, 1,4-bis(hydroxymethyl)cyclohexane and 1,3-bis(hydroxymethyl)benzene.

23. The composition according to claim 22 wherein the aliphatic glycol is selected from the group consisting of ethylene glycol and 1,4-butanediol.

24. The composition according to claim 23 wherein the glycol is ethylene glycol.

* * * * *